United States Patent [19]

Bass

[11] 3,920,975

[45] Nov. 18, 1975

[54] DATA COMMUNICATIONS NETWORK REMOTE TEST AND CONTROL SYSTEM

[75] Inventor: Larry F. Bass, Mission Viejo, Calif.

[73] Assignee: Rockwell International Corporation, El Segundo, Calif.

[22] Filed: Nov. 14, 1974

[21] Appl. No.: 523,624

[52] U.S. Cl. .................. 235/153 AK; 340/146.1 BE

[51] Int. Cl.$^2$ .................. G06F 11/00

[58] Field of Search ............ 340/146.1 BE, 146.1 E, 340/172.5; 235/153 AK, 153 AE; 179/175.2 R, 175.2 C

[56] References Cited

UNITED STATES PATENTS

| | | | |
|---|---|---|---|
| 3,622,877 | 11/1971 | MacDavid et al. | 340/146.1 E |
| 3,787,810 | 1/1974 | Wiggins et al. | 340/146.1 E |
| 3,790,769 | 2/1974 | Ziegler | 235/153 AK |
| 3,805,038 | 4/1974 | Buedel et al. | 235/153 AK |
| 3,806,887 | 4/1974 | Schulte et al. | 340/172.5 |
| 3,810,120 | 5/1974 | Huettner et al. | 235/153 AK |
| 3,818,199 | 6/1974 | Grossmann | 235/153 AK |
| 3,825,901 | 7/1974 | Golnek, Sr. et al. | 340/172.5 |
| 3,838,260 | 9/1974 | Nelson | 235/153 AK |
| 3,838,398 | 9/1974 | Caputo | 340/172.5 |

OTHER PUBLICATIONS

J. R. Kelly, A Remote Test For Data Sets, Bell Laboratories Record, Vol. 42, No. 10, Nov. 1964, pp. 350–355.

*Primary Examiner*—Charles E. Atkinson
*Attorney, Agent, or Firm*—Howard R. Greenberg

[57] ABSTRACT

A remote test and control system for use with a data communications network having primary and backup facilities provides full network testing and switching capability from a central location, thereby obviating the need for manual supervision at the remote data terminal stations served by the network.

15 Claims, 11 Drawing Figures

AUDIO LOOP

ONE WAY

DIGITAL LOOP

MODEM

DATA COMMUNICATIONS NETWORK REMOTE TEST AND CONTROL SYSTEM

BACKGROUND OF THE INVENTION

The present invention generally concerns data communications networks having primary and backup facilities and is specifically directed to a remote test and control system for testing and reconfiguring the facilities from a central location without the need for manual supervision at the network remote data terminal stations.

The wide acceptance and current popularity of data processing is evidenced not only by the amount of data processing equipment currently in use, but also by the marked interest of public and specialized common carriers in providing data communications networks for meeting the burgeoning data traffic demands arising from the flow of data between distant locations. These traffic demands and their dramatically increasing growth patterns are due in no small part to the system design philosophy that it is often economically expeditious, even if not absolutely necessary, to process at one centralized location data from a number of geographically separated data terminals. For example, necessity might apply to the rapidly increasing point of sale transactions wherein credit and inventory controls are executed from a central memory bank for a number of commonly owned retail stores; economical expediency might apply to the time sharing of an off site single large computer by a number of remotely located facilities rather than providing an individual small computer on site at each one of those facilities.

In either case, the marriage of data communications with data processing is a fact of commercial life and represents sizeable capital investments by the business community. Because of these investments it is essential that data communications systems, comprising the networks which provide the communication links and the data terminal stations connected thereto for transmitting and receiving the data information, be utilized to the fullest extent possible so as to most efficiently employ capitalized investment. Consequently, it is imperative that the system operate with as great a reliability as practicable to assure the greatest degree of availability for data transmissions. Moreover, delays in the acquisition of requested data may materially and detrimentally impact or even prove critical to a business operation because of the need for and emphasis on the continuity and speedy real time retrieval of information, the airlines industry being one example thereof. This provides even greater impetus for maximizing data communications systems reliability.

In accordance with the foregoing, it is not uncommon to find duplication of components in data communications systems so that when one component fails because of some malfunction it can be replaced by another to quickly restore service while the component malfunction is diagnosed and corrected and the component is restored to service, thereby maintaining service continuity in the intervening period. For instance, a number of remote data terminal stations might be interconnected with a central processing station by two communication links, a link being defined herein as a half or full-duplex two-way transmission path including all of the associated equipment for passing signals between the remote and central stations over any medium whether it be wire or air. The link can be a dedicated one devoted to a particular customer or in the case of the telephone system a dial circuit associated with the normal telephone switched network which is accessed by conventional telephone dialing. One link would be a primary, normally used for data traffic with the other being a backup for emergency contingencies in the event that the primary link develops a malfunction. In that case upon learning of the malfunction, the backup link would be placed into service in lieu of the primary link until the malfunction was diagnosed and corrected and the primary link restored to service. When the data communications network is one designed for bandwidth limited voice communications the backup link is quite often normally used for voice communications so as to maximize the use of capitalized investment. In this arrangement, voice communications would be forced to yield to data communications whenever the link was required as a replacement for its primary.

Once a backup arrangement is decided upon for the data communications network, in order to maintain the same consistency of reliability throughout the system, it is usually desirable to also provide backup components within each of the data terminal stations themselves. When the communications network is designed for bandwidth limited voice communications, as is the telephone system, it is not uncommon to supplement the requisite modem at each station required for interfacing the data terminal with the network with a backup modem. Consequently, if the primary modem malfunctions, the other modem acts as a replacement so as not to disable the data terminal during the period needed to diagnose and correct the malfunction and restore the primary modem to service.

Although the use of backup facilities ameliorates the longer term detrimental effects of malfunctions in data communications network, there still remains the problem of first, determining that there is a system malfunction; second, locating the malfunctioning component so that it can be isolated from the rest of the system; and third, replacing it with its backup counterpart to restore service while the malfunction is diagnosed and corrected. Since the time that the system or any part of it is down because of a malfunction is economically wasteful, it is imperative that this three-step operation be performed as expeditiously as possible. Once the presence of a malfunction is recognized, usually through some difficulty encountered by a user or a preventive maintenance program, the malfunctioning component is normally located through the cooperation of two people, one at the central processing site and the other at the data terminal stations for applying and interpreting the results of various tests which are performed. Not only does this entail delays since personnel have to be dispatched to the remote stations (although personnel could be stationed on site on a permanent basis this is not usually a viable economical alternative in view of the many stations which may comprise a system), but also the specialized training and employment of numerous people since in many cases the terminal stations which comprise a data communications system may be spread over an expansive area. With the dramatic growth of the data communications field and the great sums of money devoted thereto this is a serious problem. Recognizing the problem, remote test systems have been developed for testing data communications systems from a central location thereby obviating the need for personnel at the data terminal stations. However, these systems are not comprehensive in that they do not provide the full battery of tests needed to quickly and accurately detect and isolate malfunctioning components nor thereafter to expeditiously restore service by remotely placing the required backup facilities into operation.

With the foregoing in mind, it is a primary object of the present invention to provide a new and improved remote test and control system for use with data communications networks for determining and locating system malfunctions from a central location.

It is a further object of the present invention to provide such a remote test and control system having capability for reconfiguring the communications network facilities from the central location as required by replacing identified malfunctioning components with their backup counterparts.

It is still a further object of the present invention to provide such a remote test and control system which is easily and inexpensively made compatible with all portions of data communications networks despite their various configurations and equipment.

These as well as other objects may be readily appreciated by referring to the Detailed Description of the Preferred Embodiment which follows hereinafter together with the appended drawings.

BRIEF DESCRIPTION OF THE INVENTION

The remote test and control system of the invention provides remote testing and switching capability for a data communications network having primary and backup facilities through a network controller located at a central location which contains standard test equipment for generating and analyzing the test signals that are applied to the network for troubleshooting as well as generating and transmitting to the individual network remote data terminal stations command signals for effectuating switching changes thereat to reconfigure the network by switching between primary and backup facilities and also establish various test modes. The network controller may include additional equipment for receiving status signals from the terminal stations indicating various station conditions which may be of interest to an operator at the central location.

Each network data terminal station is provided with a terminal controller responsive to the command signals for implementing the switching directives by switching the station to one or the other of the communication links serving it and selecting between the two station modems when the network is voice bandwidth limited as is the telephone system. The terminal controller may include additional equipment for generating and transmitting to the network controller status signals when desired as well as various test signals used in troubleshooting of the network.

DETAILED DESCRIPTION OF THE PREFERRED EMBODIMENT

Figure 1:
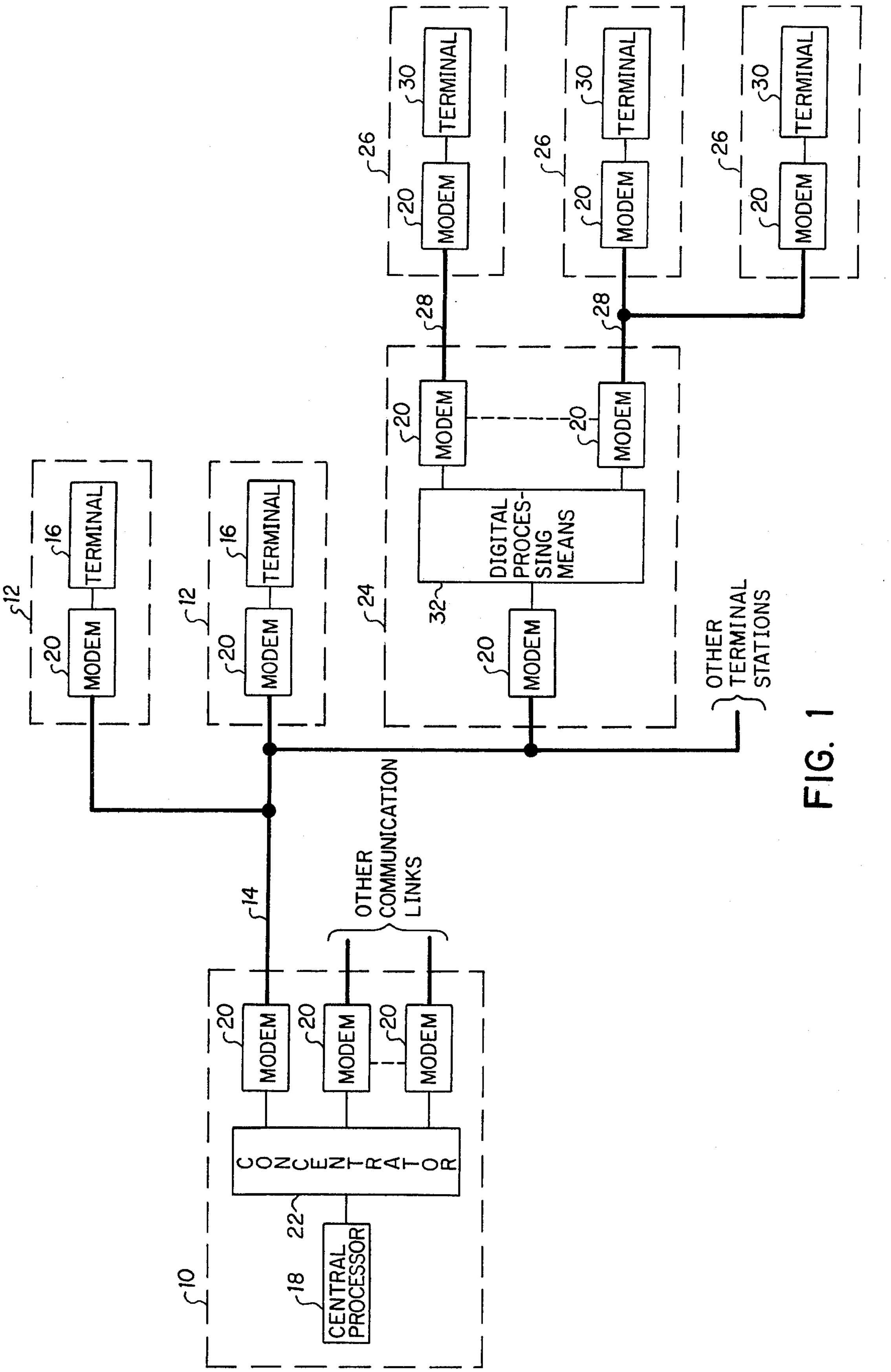
FIG. 1 depicts a typical data communications network with which the remote test and control system of the invention is intended to function.

FIG. 1 depicts a typical data communications network with which the remote test and control system of the invention is intended to operate. The network serves a central processing station 10 and a plurality of remote data terminal stations 12 which are all geographically separated from each other but are interconnected via a communication link 14 which may take any appropriate form such as wire, microwave, etc. The communication link 14 may comprise a single path for both transmitting and receiving data signals in half-duplex fashion or two paths, one for transmitting and the other for receiving signals if full-duplex operation is desired. Each remote station 12 connects to the communication link 14 through its own individual branch portion of the link, the connection to the common portion of the link 14 being made as dictated by the system; for example, at a central switching office in the case of the telephone network. Although the communication link 14 is shown in a multidrop arrangement (one path shared by two or more stations 12), the invention will hereinafter be seen to be equally compatible with a point-to-point network wherein each remote station 12 is directly interconnected with the central station 10 by its own individual link.

Each of the remote stations 12 contains a data terminal 16 for generating data signals in digital binary form which are transmitted over the communication link 14 to a central processor 18 located in the central station 10. After processing the data, the central processor 18 transmits the appropriate data response back to the terminal 16 from whence the input data originated. Since the data communications network, as depicted herein for exemplary purposes only, is voice bandwidth limited, for example as the telephone network would be, a plurality of modems 20 are included to provide the well known function of transforming the data digital signals to and from a format which is suitable for transmission over the bandwidth limited network. Since the central processor 18 may interconnect with other communication links, the central station 10 also includes a concentrator 22 as an interface therebetween.

In order to minimize capital costs, our typical data communications network also serves an intermediate processing station 24 which interconnects with a plurality of remote data terminal stations 26 via their individual branch circuits 28. Remote stations 26 are exactly like remote stations 12 except that data signals from their respective data terminals 30 are processed by a digital processing means 32 located in intermediate station 24 in lieu of or in addition to the central processor 18 located in the central station 10. The type of processing done by processing means 32 will of course depend upon the nature and configuration of the particular data communications network. For example, the processing means 32 could be merely a concentrator thereby avoiding the need for extending the communication link 14 directly to all of the remote stations 26. In such case, data signals passing between the remote stations 26 and the central station 10 would be reformatted and resequenced as they pass through the digital processing means 32. Alternatively, the digital processing means 32 could be another processor for processing data from the remote stations 26 under the control and in conjunction with the central processor 18 located at the central station 10. In any event, it is to be realized that the digital processing means 32 can take any one of well known forms dependent upon the particular functions it is to provide. As with the central and remote stations, the intermediate station 24 includes modems 20 for interfacing with the bandwidth limited data communications network.

Although for the sake of simplicity, they are not shown in FIG. 1, our typical data communications network does provide backup facilities for maintaining service continuity in the event of equipment failures. For example, each modem 20 has an exact duplicate which can be switched to replace it should an operating problem develop therein. Similarly, the communication link 14, and branch circuits 28 are afforded backup capability should operating problems develop therein. The backup link 14 and branch circuits 28 may be either dedicated, viz. in parallel with their primary service counterparts but disconnected from the remote station equipment until required for backup service by closing the switches at the stations (the common and branch portions of the backup link 14 would already be connected at the connection centers such as the central office in the telephone network) or dial backup circuits in the case of the switched telephone network in which case separate telephone connections would be established between each remote station 12 or 26 and the central station 10 for passing signals therebetween over the telephone voice network. In either case, as presently exists, all of the required switching would be done manually once the problem was identified and isolated through various tests performed with the aid of skilled personnel located at all of the remote stations of the network.

As will be appreciated hereinafter, the particular date transmission arrangement used with the data communications network is not germane to the invention. Thus, the remote test and control system disclosed herein may be made compatible with any type of signalling system whether it be strictly a polled arrangement wherein each remote station is sequentially addressed by the central processor or a multiplex arrangement, frequency or time division, permitting more than one communication to take place simultaneously.

Figure 2:
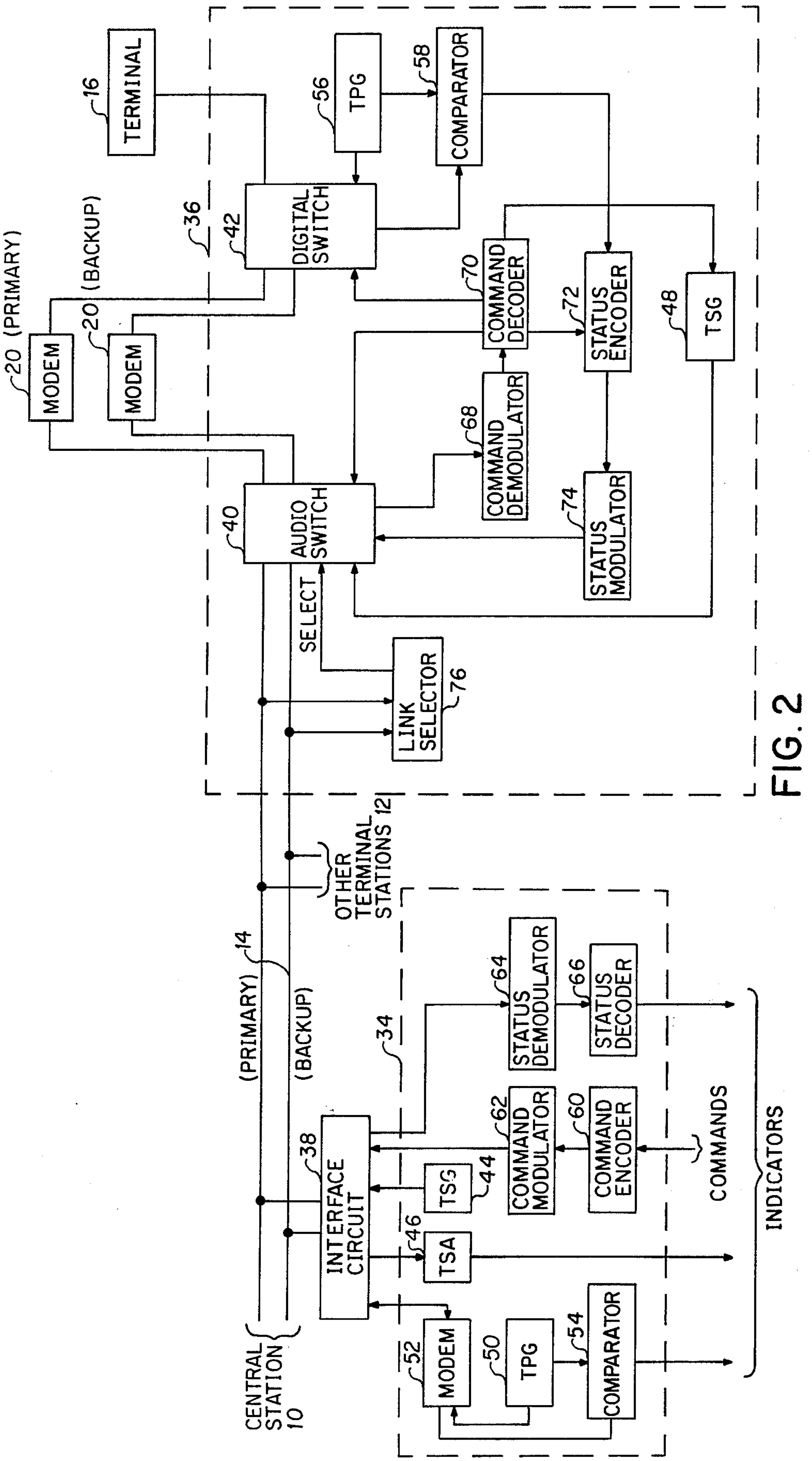
FIG. 2 is a functional block diagram of the invention.

As shown in FIG. 2, the remote test and control system of the invention employs two major components, namely, a network controller 34 located at a central site, preferably central station 10 and a terminal controller 36 located at each of the remote stations 12 and 26 and the intermediate station 24. Each pair of station modems 20 providing primary and backup service requires its own individual terminal controller 36. The network controller 34 is connected to the primary and backup communication links 14 through an interface circuit 38 which may be merely a patch field or if desired a more sophisticated switching means for accessing the links and which also includes the standard coupling bridge, filters and amplifiers normally found in a communications system. The network controller 34 includes equipment for applying test signals to the data communications network and for measuring the results thereof. The network controller 34 further includes equipment for applying command signals to the data communications network to effect switching changes at the remote data terminal stations 12 and 26 as well as intermediate station 24. These command signals are applied to the network not only to reconfigure it for operating purposes by switching over to backup facilities, but also to place the different network elements into various test modes.

Figure 3:
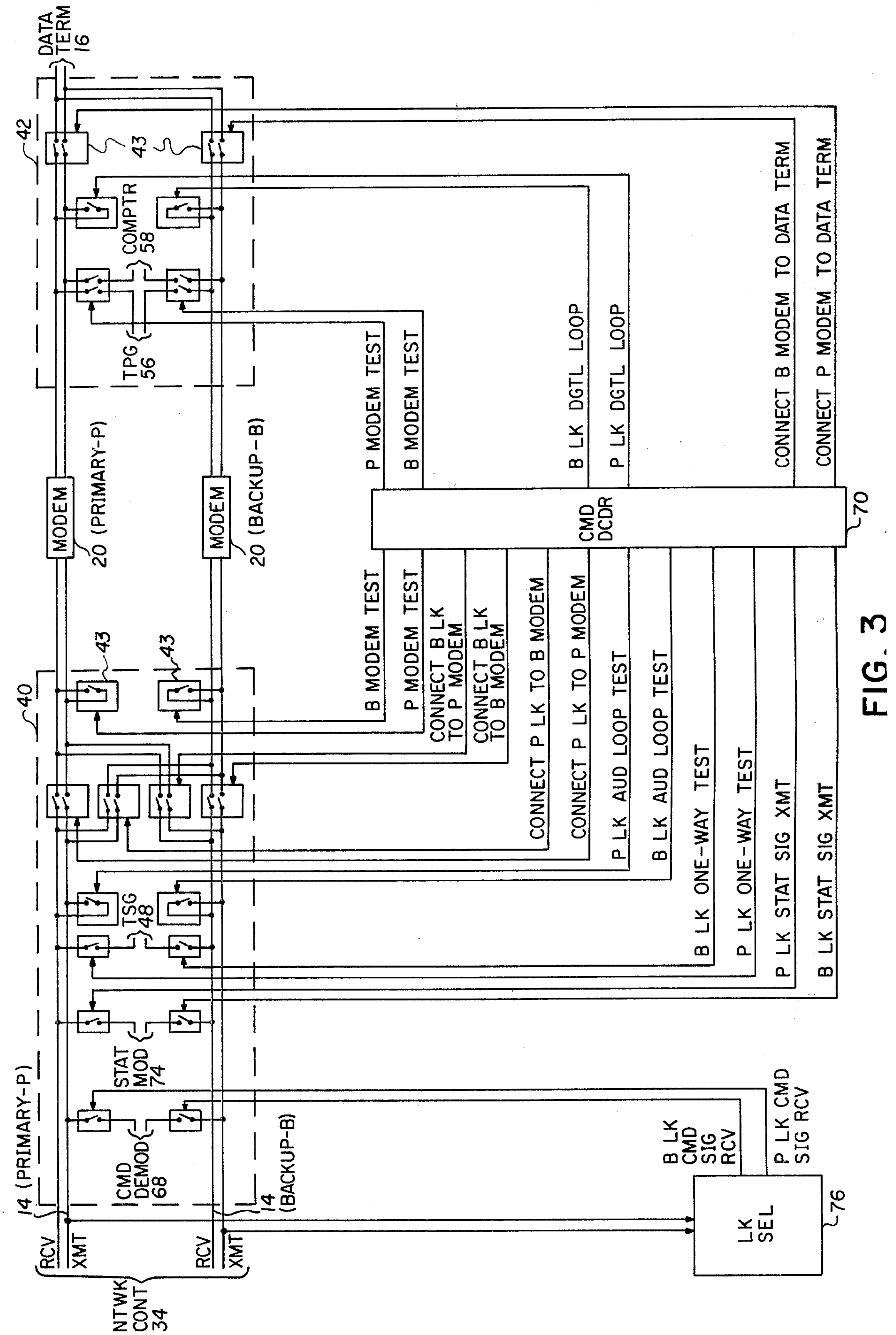
FIG. 3 is a symbolic representation of the audio and digital switches which comprise the system terminal controller together with the command signals to which the switches are responsive.
Figure 4A:
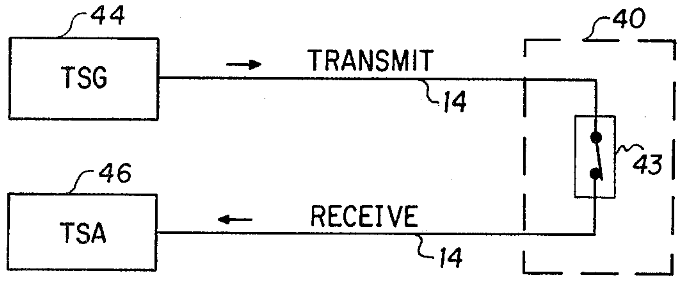
FIG. 4 shows the various tests which the remote test and control system performs.
Figure 4B:
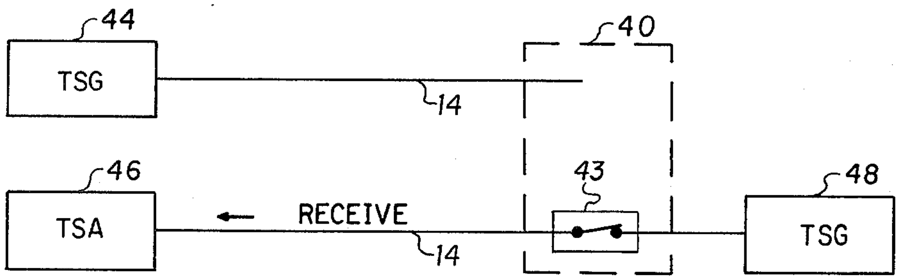
Figure 4C:
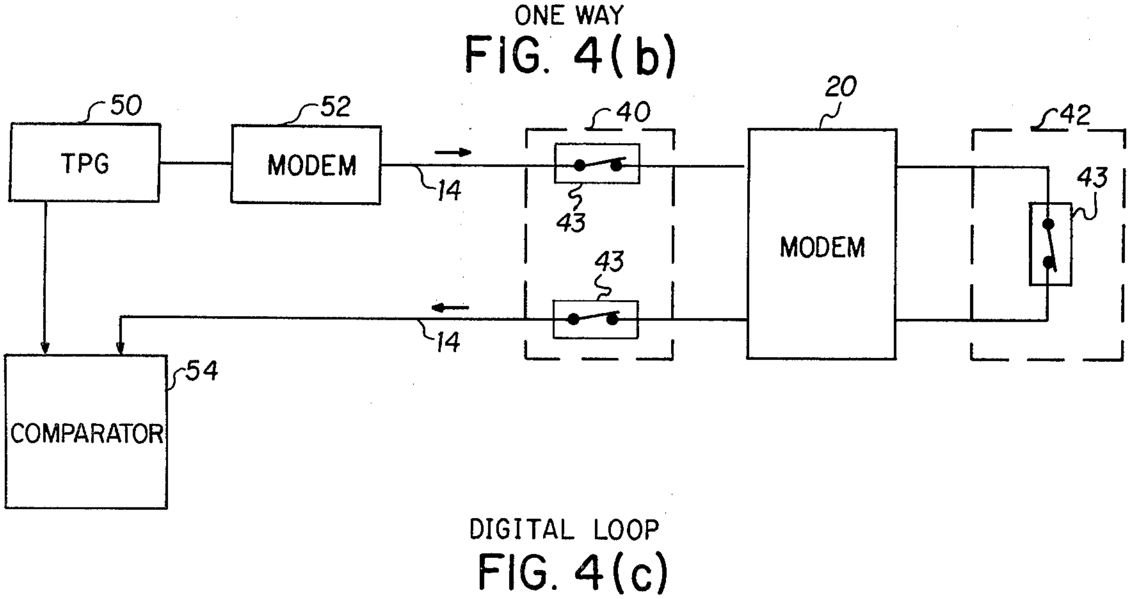
Figure 4D:
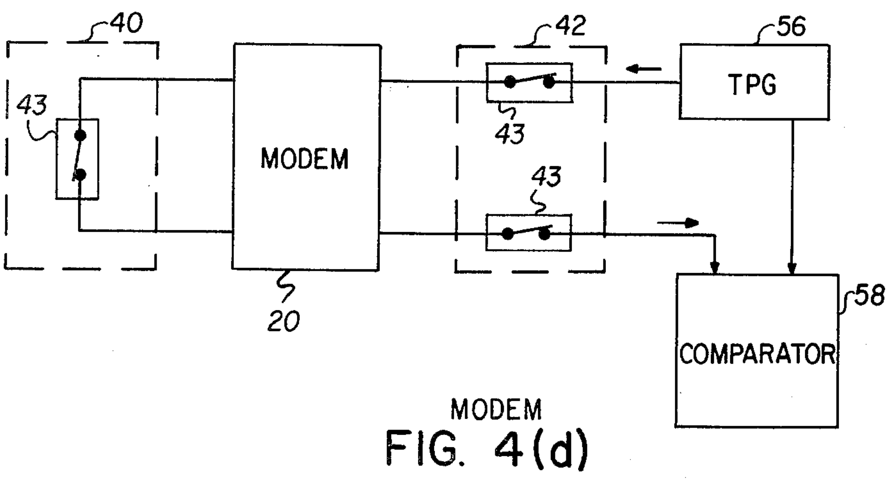

The terminal controller 36 includes equipment responsive to the command signals for effecting the switching changes and for generating test signals for testing network elements to detect faults as well as status signals to permit the network controller 34 to monitor conditions as its associated remote station. As shown, the primary and backup modems 20 are connected between an audio switch 40 and a digital switch 42, the former for connecting the audio terminals of either of the modems 20 to either of the communication links 14 and the latter for connecting the digital terminals of either of the modems 20 to the data terminal 16. As will be apparent from FIG. 3, these switches 40 and 42 include individual switches 43, shown symbolically, for performing the foregoing switching functions as well as others, to be described shortly, in response to various command signals from the network controller 34. The individual switches 43 of audio and digital switches 40 and 42, respectively, may be electronic or electromechanical whichever is preferred with their control circuitry (considered part of the switch 43, but not shown) assuming any one of various schemes well known in the art. Each switch 43 closes in response to the designated command signal shown in FIG. 3 in order to accomplish the switching directive transmitted from the network controller 34 over the transmit portion of link 14. Status and test signals are transmitted back to the network controller 34 from the terminal controller 34 via the receive portion of link 14.

Before continuing with a description of the invention, it would be well to pause at this point to present the various standard network tests which can be performed by the remote test and control systems herein. These tests are directed to various parts of the data communications network and are designed to measure parameters affecting the audio and digital signal performance of the network. As shown in FIG. 4(*a*), transmission characteristics of the full duplex communication link 14 can be measured through an audio loop test by connecting the transmit and receive portions of the link 14 together via the audio switch 40 at the desired remote station location and applying to the transmit portion various complex frequency signals generated by a test signal generator (TSG) 44 located in the network controller 34. After passing through the loop via the desired remote station, these test signals are received by a test signal analyzer (TSA) 46 located in the network controller 34 which allows one to determine how the original complex frequency signals generated by TSG 44 have been changed by transmission through the communication link 14 and consequently the various circuit characteristics associated therewith. For example, it will be readily apparent to those skilled in the art that such characteristics as line loss, frequency response, envelope delay, harmonic distortion, phase jitter, frequency offset, etc., can be and are in fact measured in this fashion. The TSG 44 and TSA 46, being readily available commercial devices from such companies as Hewlett Packard and Collins Radio, need no further explanation here. If further technical information is desired, however, the reader is referred to two Bell System Technical Reference publications (numbers 41000 and 41009) which present the pertinent underlying theory. By comparing the measured parameters with established standards, or better yet, actual predetermined operating parameters for the actual data communication link 14, one is able to ascertain the existence of some problem in the tested portion of the data communications network through unacceptable deviations therefrom.

Having determined from the audio loop test that some problem does exist in the communication link 14, one can further determine whether the problem exists in the transmit or receive portion thereof by a one-way test (FIG. 4(*b*)) wherein complex frequency signals are applied to the receive portion of the communication link 14 by a test signal generator (TSG) 48 located in the remote station at which the audio loop test was performed and measuring the received signals at the network controller 34 with the TSA 46. This one-way test will indicate if there is a problem in the receive portion of the communications link 14, or if not, by comparing the characteristics of the receive portion with the characteristics of the communication link 14 if there is a problem in the transmit portion. Thus, the combination of the audio loop and one-way tests provides information for completely analyzing the data communications link 14 with respect to both its transmit and receive portions. When the communications link 14 is used for half-duplex operation then only the one-way test is required for ascertaining the characteristics thereof.

As shown in FIG. 4(*c*), a digital loop test can be performed with either the primary or backup modem 20 at the desired remote station by properly switching the audio and digital switches, 40 and 42, respectively, associated therewith. In this test, the digital terminals of the modem 20 are short circuited via the digital swith 42 so that signals received over the transmit portion of the data communication link 14 are passed through the audio receive terminals of the modem 20 and are immediately fed back via the audio transmit terminals thereof. These digital test signals which contain a pattern of some pseudo-random oriented bits are generated by a test pattern generator (TPG) 50 and applied to the transmit portion of the communication link 14 via a modem 52, both located in the network controller 34. A comparator 54 located in the network controller 34 receives the digital signals over the receive portion of the communication link 14 for comparison with the signals as originally transmitted. Detected changes therebetween provide information for the entire digital loop. Since the TPG 50 and comparator 54 are well-known commercial devices available as Modem Test Sets from a number of companies such as Bowmar and International Data Sciences they require no further explanation here.

As shown in FIG. 4(*d*), a fourth test is possible for analyzing the performance of a modem 20 in a remote station. This modem test is performed by shorting out the audio transmit and receive terminals of the modem 20 via audio switch 40 and connecting its digital terminals between a TPG 56 and a comparator 58 both being located at the remote station. These function the same as their counterparts in the network controller 34 thereby providing information for evaluating the digital performance of the modem 20. Since it is desired, if not imperative, for reliability purposes that the backup modem 20 be fully operational if called into service to replace its primary counterpart this modem test can be continously performed with respect thereto. The detection of a malfunction can be reported to a human operator at the network controller 34 by means of a status signal like all other status signals so that the malfunction can be cured before the backup modem 20 is required for service.

As may well be appreciated, the foregoing tests can be performed on either the primary or backup facility, dependent upon what the test is intended to accomplish, namely, fault finding for the data communications network after a problem has been identified or preventive maintenance. By performing the audio and digital loop tests at the various terminal stations served by the network the particular section or sections of the communication link 14 in which a problem has developed can be located by process of elimination, each station affording a different section of the link for testing. The testing flexibility is only limited by the complexity and expense one wishes to go to in the audio and digital switches 40 and 42, respectively, to permit various switching combinations.

Returning now to FIG. 2, it will be seen that operator commands for transmission to the remote stations 12 and 26 as well as intermediate station 24 are entered into a command encoder 60 located in the network controller 34. The command signals are in the form of digital bits which comprise a command digital word, there being a sufficient number of bits in the data field for performing all the requisite functions, with the location of each bit therein being associated with a particular function to be performed. The command word would, of course, have a preamble for recognition and synchronization purposes as well as an address field for directing the command word to the appropriate station.

The output of command encoder 60 is applied to a command modulator 62 which transforms the digital information in any one of well-known ways to a proper format for transmission over the communication link 14 via the interface circuit 38. In a preferred embodiment, the use of phase shift keying modulation using a carrier signal frequency of 300 Hz. and a data rate of 50 baud permits the command signals to be transmitted in the lower portion of the voice bandwidth so as to avoid interference with the data signals being transmitted over the data communications network or unnecessarily interrupting data signal transmissions when transmitting command words.

Status signals in the form of digital words are received over the communication link 14 via the interface circuit 38 in a status demodulator 64 located in the network controller 34. After the status signal is demodulated in accordance with whatever modulation technique is employed, the information is applied to a status decoder 66 where the status digital word is converted to an appropriate display format along with the outputs of comparator 54 and TSA 46. The display format can be any conventional type such as light indicators, CRT, teletype, etc.

In addition to the equipment previously discussed, each terminal controller 36 includes a command demodulator 68 for receiving the command signals from the network controller 34 via its associated audio switch 40 and the communication link 14. After extracting the command digital word in accordance with the type modulation used, the command demodulator 68 applies it to a command decoder 70 which routes the control bits to their intended destinations. For example, signals for controlling the connection of the primary and backup communication link 14 to the associated controller's TSG 48 or the station's modems 20 as well as interconnecting the transmit and receive portions of the link 14 for audio loop testing are applied to the audio switch 40. The command signal for controlling which of the station modems 20 is to be connected to its associated data terminal 16 is applied to the digital switch 42. The signal for controlling the TSG 48 transmission is applied by the command decoder 70 thereto.

Each terminal controller 36 also includes a status encoder 72 for structuring status digital words to be transmitted back to the network controller 34 for providing information about the remote station to a human operator stationed at the network controller 34 site. As shown in FIG. 2, this information could include the outputs of the station comparator 58 and the command decoder 70 for respectively indicating the results of the modem tests (previously discussed) and confirming that the command digital word transmitted to the terminal controller 36 by the network controller 34 was properly received. If one desired to ascertain the proper operation of the audio and digital switches 40 and 42, respectively, in response to command signals from the network controller 34, that data could also be applied to the status encoder 72. The output of the status encoder 72 is applied to a status modulator 74 for proper formatting before being transmitted to the network controller 34 via the communication link 14 and the associated audio switch 40.

A problem in the primary communication link 14 preventing the passage of normal data signals to and from the central station 10 would also prevent the transmission of command signals from the network controller 34. Thus, if the command demodulator 68 of the terminal controller 36 was connected only to the primary communication link 14, there would be no way to remotely switch the remote station 12 over to the backup communication link 14 when required. Although the command demodulator 68 could be connected to both the primary and backup communication link 14 to avoid this problem, signals on the backup link could conceivably interfere with the command signals being received over the primary link. For example, noise could prove to be troublesome and more than that audio signals when the backup link is normally used as a voice communication path.

This problem is overcome by the present invention through a link selector circuit 76 located at each remote station which monitors both the primary and backup communication link 14 to determine over which one command control signals are being transmitted. Upon determining which one, the link selector 76 selects that link for connection to its associated terminal controller 36 by applying a signal to the associated audio switch 40 which then connects the associated command demodulator 68 thereto. Thus, when a primary communication link 14 in service develops a problem requiring the switchover to the backup link, the operator at the network controller 34 would begin transmitting command signals via the command modulator 62 over the backup link which upon detection by the link selector 76 would cause its associated audio switch 40 to switch its associated command demodulator 68 over to the backup link. Any initial command signal, including a dummy signal not addressed to any particular station would suffice since it is only the detected signal level (as will be explained later) that matters. Thereafter, the command signal ordering an addressed remote station 12 to switch its modem 20 over to the backup circuit would be received by the associated command demodulator 68 which would then cause audio switch 40 to make the switchover.

Figure 5:
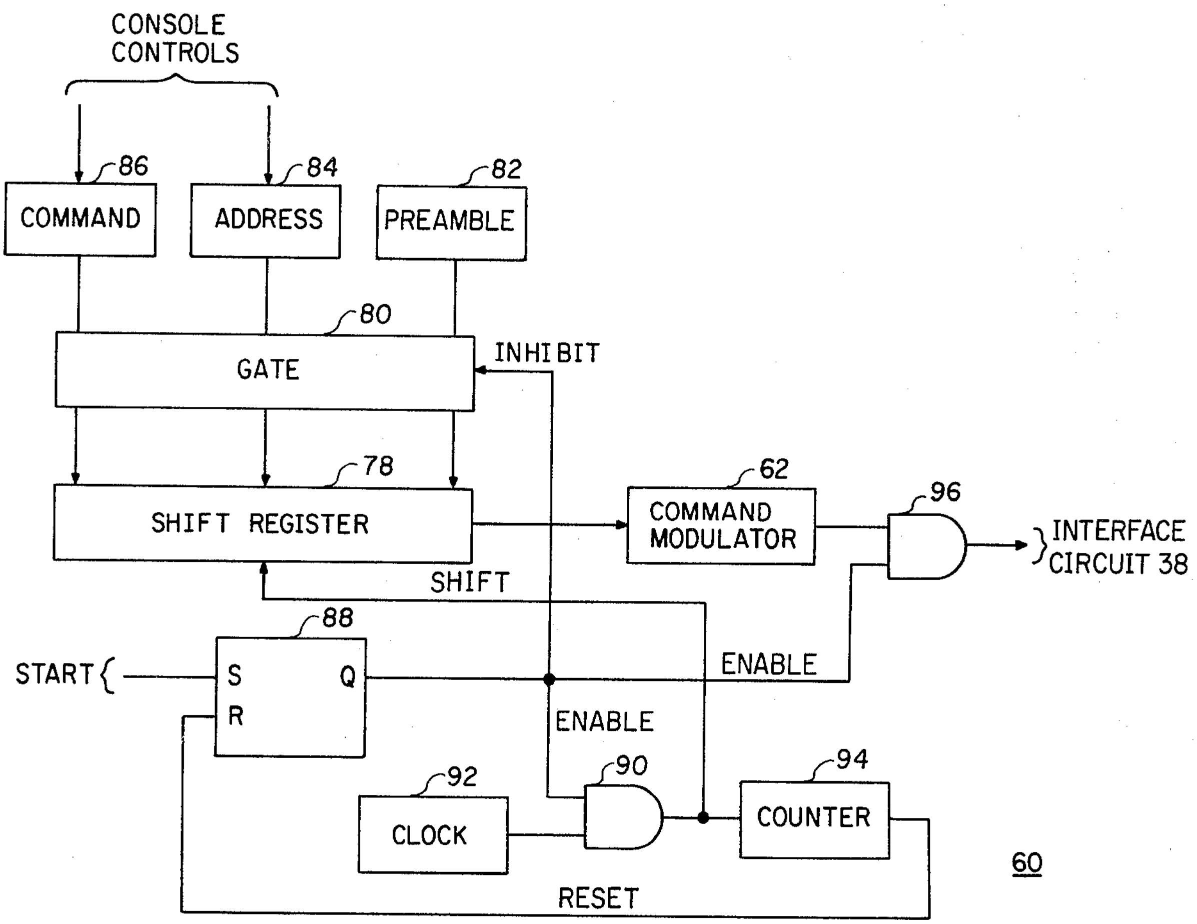
FIG. 5 is a functional block diagram of the command encoder in the system network controller.

Details of the network controller command encoder 60 are shown in FIG. 5. The command digital word is formed in a shift register 78 by parallel entry therein of the command, address and preamble bits which are fixed, are generated in a preamble generator 82 while the command and address bits are generated by command and address generators 84 and 86, respectively, in response to human controls by the operator (for example, by flipping console switches). Thus, the operator is able to select the command he wishes to implement together with the remote station for receiving that command by appropriately setting the bits of the command and address generators 86 and 84, respectively. Once the command and address information has been entered into shift register 78, (gate 80 being enabled at this time) the operator initiates transmission of the command word by applying a momentary start signal to the S input of an RS flip-flop 88 which sets it, causing its Q output to go high. This Q output is applied to an AND gate 90 to enable it at this time to pass pulses from a clock circuit 92 to a counter 94. The counter 94 is designed to provide a count equivalent to the number of bits in a command digital word whereupon it then applies a momentary signal to the R input of flip-flop 88 via its output lead to reset that flip-flop. At that time, its own count is reset to zero. The low Q output of flip-flop 88 following a full count by counter 94 partially inhibits AND gate 90 thereby preventing the clock pulses from passing therethrough until the next start signal is received. In addition to incrementing the count of counter 94, the output of fully enabled AND gate 90 is applied to shift register 78 so that during this time the digital command word is shifted out via command modulator 62 whose output is connected to the interface circuit 38 via an AND gate 96. A second input to AND gate 96 is derived from the Q output of flip-flop 88 so that that gate is inhibited from passing the carrier signal generated in command modulator 62 when no command word is being transmitted from the network controller 34 (Q output law). During command word transmissions gate 80 is inhibited by the high Q output of flip-flop 88.

Figure 6:
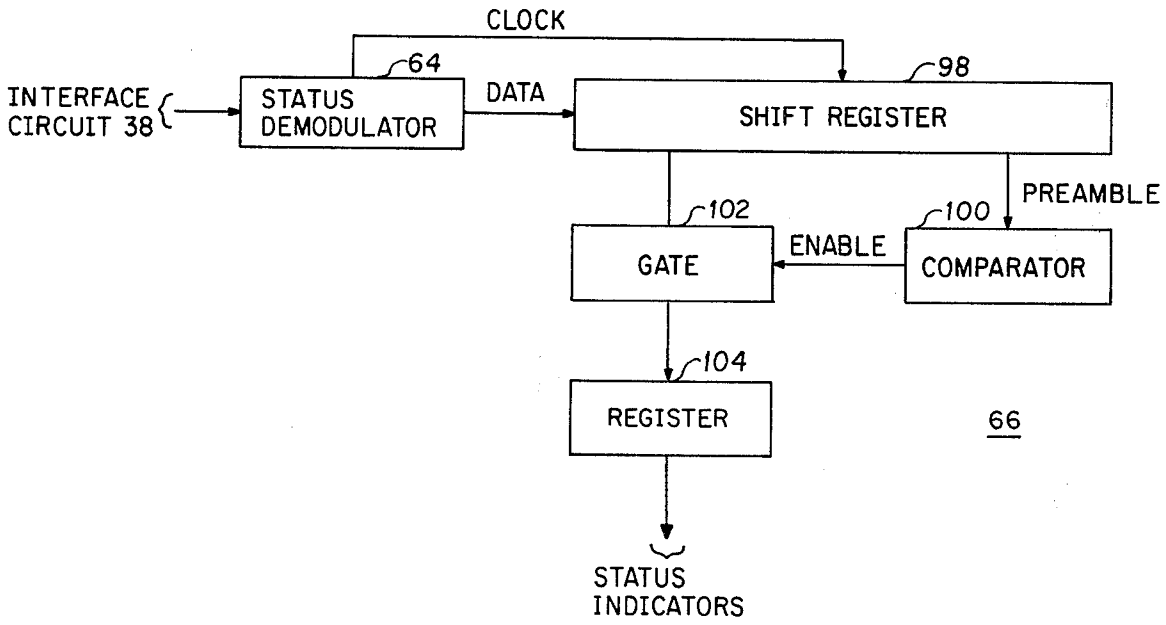
FIG. 6 is a functional block diagram of the status decorder in the system network controller.

The status digital word, which has the same bit structure as the control digital word, is received in the network controller status decoder 66, the details of which are shown in FIG. 6. After separating the clock and data information from one another, the status demodulator 64 applies both to a shift register 98 so that data is serially entered into the register at the same rate that it is being transmitted. The bits in the preamble field location within the shift register 98 are continuously compared with the fixed preamble code in a comparator 100 so that when a match is detected an enable signal is applied at that time by the comparator 100 to a gate circuit 102 thereby permitting the status bit information located in the data field of the status digital word to be parallel entered into a register 104 whose output is connected to any appropriate type of indicators. A preamble code match occurs of course only when the status word is fully entered into shift register 98. Once new data begins entering shift register 98, the comparator 100 disables gate 102 until the new data is likewise completely entered and a preamble code match is again detected.

The terminal controller command decoder 70 and status encoder 72 function exactly the same as their network controller counterparts just described and shown in FIGS. 5 and 4, respectively. The only difference between the command decoder 70 and the status decoder 66 is that the comparator in the former seeks a match in address code as well as preamble code before the shift register information is entered into a parallel entry register thus assuring that only the properly addressed station responds to the intended command. The only difference between the status encoder 72 and the command encoder 60 lies in the means by which the signal transmission is initiated. Whereas, a command signal transmission from the network controller 34 is initiated through a start signal triggered by a human operator, the status signal transmission is begun either automatically in response to the receipt of a command signal if such is the system design or alternatively in response to a specific command signal requesting the status condition of the addressed remote station.

Figure 7:
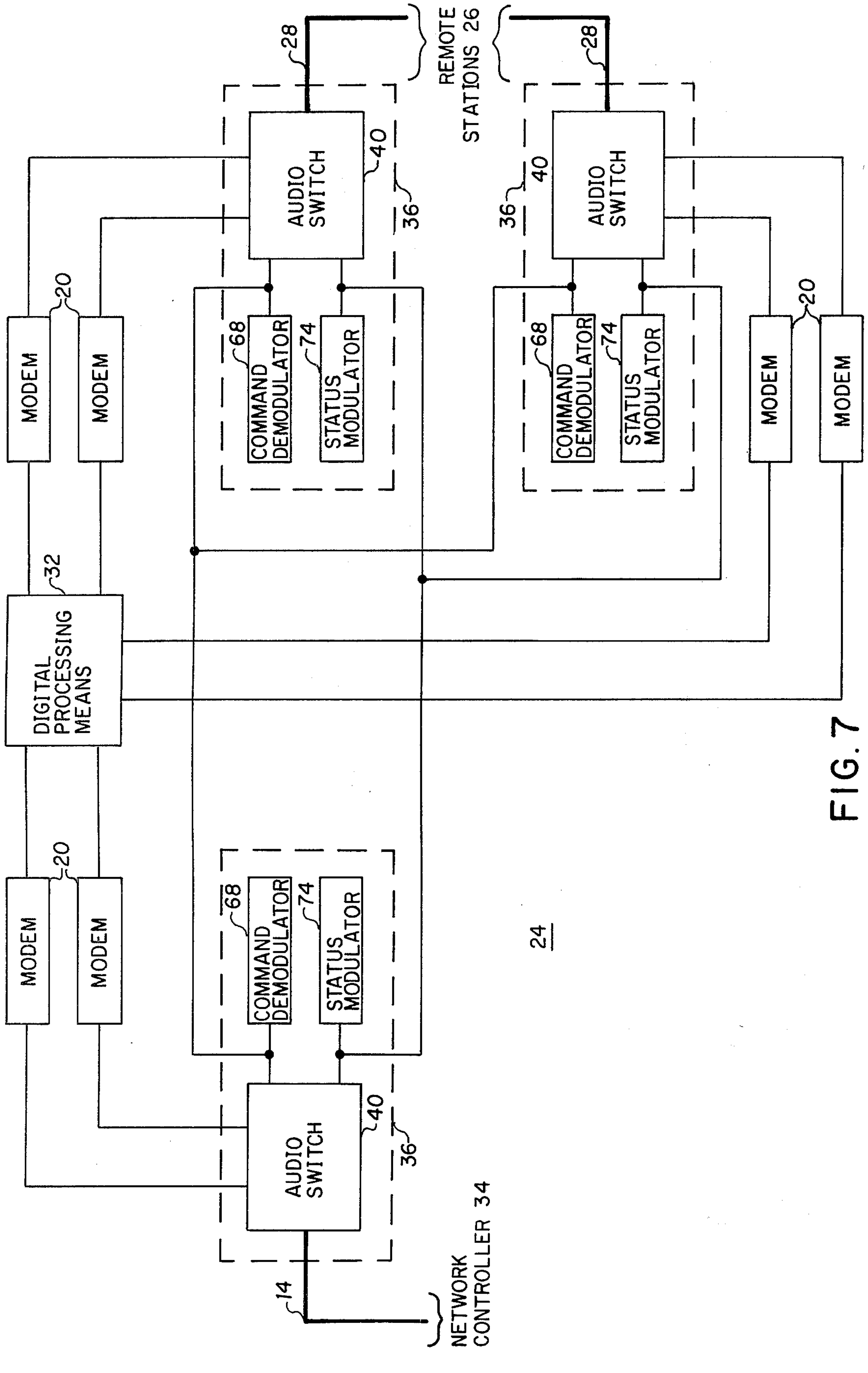
FIG. 7 is a functional block diagram of the relevant portions of the terminal controller used in a network intermediate processing station for implementing the control and status extension feature of the invention.

The presence of an intermediate digital processing station 24 of FIG. 1 poses problems in passing the command and status digital signals between the network controller 34 on one side thereof and the remote stations 26 on the other side. Since each pair of modems 20, primary and backup, located in the intermediate station 24 requires its own terminal controller 36 (to perform the same functions including switching as performed by the remote station counterpart) there is the further problem of passing the command and status signals between the network controller 34 and those terminal controllers 36 associated with the intermediate station modems 20 separated therefrom by the digital processing means 32. Although these signals like the regular data signals passing through the data communications network could obviously be passed through the digital processing means 32 this would add to the complexity of the circuitry therein as well as impose the time delays associated with the modems 20 and digital processing means 32 unnecessarily on the speed of the remote test and control system operation. These undesirable effects are obviated by the control and status extension feature depicted in FIG. 7. FIG. 7 shows the relevant portions of the individual terminal controllers 36 associated with the modem pairs of intermediate station 24 with the same pictorial relationship as that depicted in FIG. 1. The input leads to all of the terminal controller command demodulators 68 are connected together while the input leads to all of the terminal controller status modulators 74 are likewise connected together. Thus, a command signal transmitted from the network controller 34 via the communication link 14 and the audio switch 40 of the upper left terminal controller 36 is accessible to any one of the command demodulators 68 located in the intermediate station 24 directly or by any located in the remote stations 26 via the communication branch circuits 28 and the audio switches 40 connected thereto in the intermediate station 24. The command demodulator 68 whose terminal controller address corresponds to that of the command digital word will be the one which receives the command signal to the exclusion of the other demodulators. Similarly, each status modulator 74 within intermediate station 24 has direct access to link 14 via the interconnecting audio switch 40 (upper left) while each station modulator 74 at a remote station 26 likewise has access thereto via its branch circuit 28 and the intermediate station audio switch 40 connected thereto. But in no event are any of the command and status signals passing through the network over link 14 required to pass through digital processing means 32 and its associated modems 20.

Figure 8:
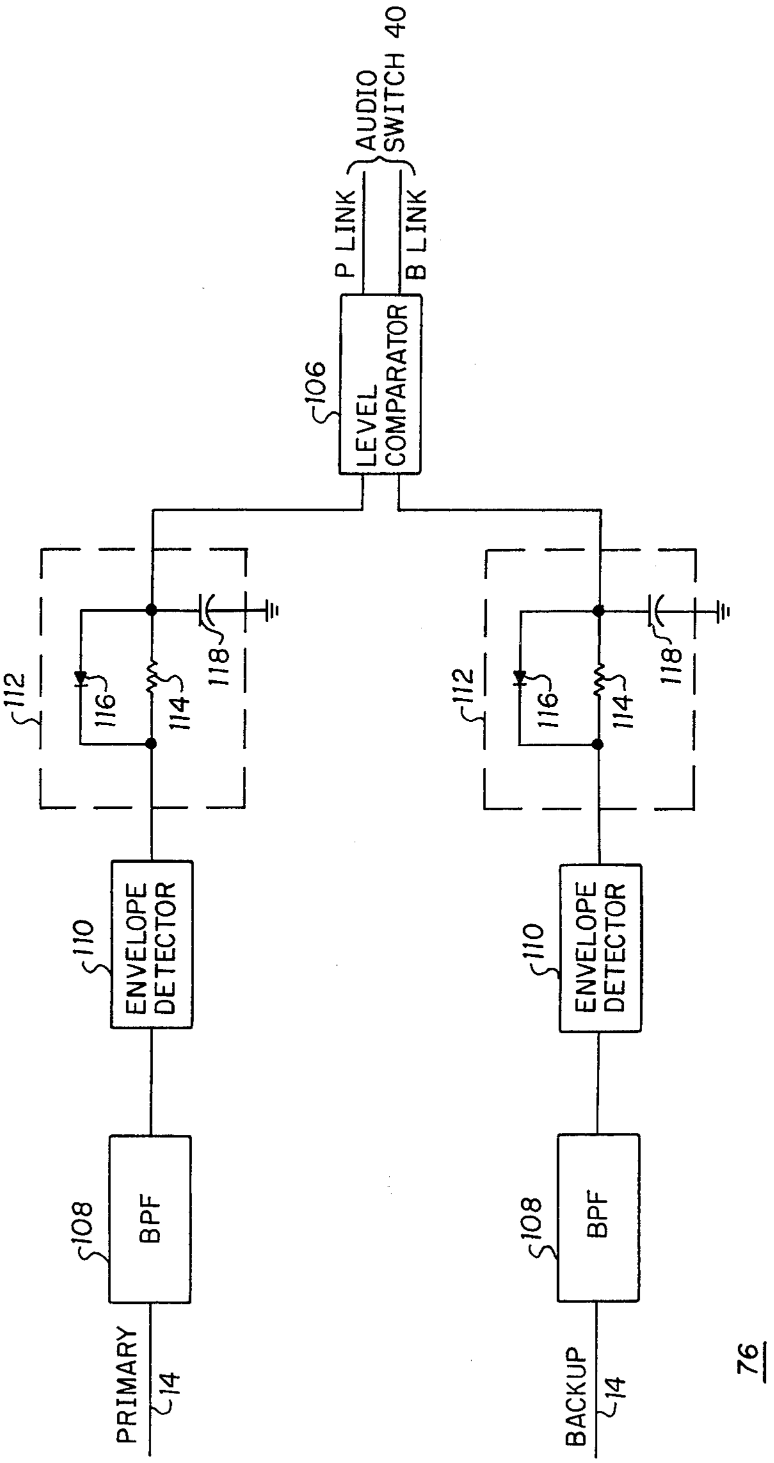
FIG. 8 shows the details of the link selector circuit for selecting the link over which command signals are to be received.

As shown in FIG. 8, the link selector 76 comprises a level comparator 106 having two inputs, each being connected to one of the communication links 14 through an individual bandpass filter (BPF) 108, an envelope detector 110 and an RC charge/discharge circuit 112 consisting of a resistor 114 in parallel with a diode 116 and in a series with a capacitor 118. The input signals to level comparator 106 are derived from the capacitors 118. The level comparator 106 has two outputs, each being associated with one of its inputs arranged so that a switching signal appears on that output whose corresponding input has a larger signal thereon. Envelope detector 110 is merely an AM detector which provides a D.C. output that is a function of the magnitude of the modulation information.

The link selector 76 takes advantage of the different characteristics between the desired command signal for detection and all the other types of undesired signals such as noise, data, voice, etc. The command signal has a narrow bandwidth (around 100 Hz.) centered around a frequency in the lower frequency spectrum (as mentioned earlier preferably 300 Hz.) so that most undesired signals are merely filtered out by BPF 108 which is designed accordingly. Voice signals which pass through BPF 108 and which normally have a high peak to average energy ratio are distinguished from the command signal which has a low peak to average energy ratio by the voltage developed across capacitor 118 which has a long charge period via resistor 114 and a short discharge period via diode 116. Thus, normal speech patterns will prevent capacitor 118 from maintaining a high signal level since during random speech pauses capacitor 118 will discharge very rapidly through diode 114. A command signal on the other hand having a duration which is ordered and much greater than the charge time constant of the RC circuit 112 will permit capacitor 118 to charge to its maximum value and hold it during the presence of the command word thus causing level comparator 106 to generate an output signal on the output lead associated with the input lead connected to that capacitor. Consequently, the link selector 76 will respond to a command signal even in the presence of a voice signal whose magnitude greatly exceeds that of the command signal. As mentioned previously any command word, even a dummy word not addressed to any station will suffice to effectuate a switchover to the desired link 14 by charging the capacitor 118 connected thereto to the appropriate level.

As demonstrated by the foregoing preferred embodiment, the invention disclosed herein provides a means for easily and expeditiously testing and reconfiguring data communications networks, including station modems when required, from a central site without the need for any human supervision at the remote data terminal stations served by the networks. Thus, facilities which develop operating problems or present future problems via a preventive maintenance program can be quickly and efficiently identified and isolated while their backup counterparts are activated to maintain service continuity even during the period of time that is required to diagnose and correct the problems. This greatly enhances overall system reliability and customer satisfaction while optimizing the utilization of capitalized equipment.

Since various modifications to the system described herein are undoubtedly possible by those skilled in the art without departing from the scope and spirit of the invention, the detailed description is to be considered illustrative and not restrictive of the invention as claimed hereinbelow:

What is claimed is:

1. A remote test and control system for use with a data communications network interconnecting a central processing station with at least one remote data terminal station, through a pair of communication links, either of which may be selected for passing data information therebetween, with each remote station containing a data terminal and a pair of modems with the data terminal being adapted for connection to the selected communication link through either modem, comprising:

command signal transmitter means for generating and transmitting command signals over at least one of the communication links, each command signal being addressed to a selected remote station;

individual command signal receiver means located at each remote station for receiving the command signals addressed to its associated station; and individual switching means located at each remote station responsive to one command signal for connecting the audio terminals and another command signal for connecting the digital terminals of either one of the associated station modems between the selected one of the two communication links and the station data terminal, respectively.

2. The remote test and control system of claim 1 including individual status signal transmitter means located at each remote station for generating and transmitting over at least one of the communication links a status signal indicative of various station conditions following the receipt of a command signal and status signal receiver means for receiving each status signal and displaying the information contained therein.

3. The remote test system of claim 2 including individual modem test means located at each remote station responsive to a command signal for continuously monitoring via its associated individual switching means a selected one of the associated station modems for malfunctions and for providing an indication thereof via a status signal.

4. The remote test system of claim 1 wherein each communication link includes two sections, one for the central station to transmit and the other for it to receive data information and wherein each of said individual switching means is responsive to a command signal for looping a communication link at its associated station by connecting the transmit and receive sections of the communication link together at the station and including an individual test signal generator located at each remote station for connection to the receive section via said individual switching means in response to a command signal for applying to the receive section test signals to measure the line characteristics thereof and test signal generator and analyzer means for receiving and analyzing the test signals over the communication receive section and for also applying test signals to the transmit section.

5. The remote test system of claim 4 wherein each of said individual switching means is responsive to a command signal for placing either of its associated station modems in a digital loop with either one of the two communication links and including digital loop measurement means for applying a digital test signal to the transmit section of the communication link, receiving the transmitted signal over the receive section, and comparing the received signal to the transmitted signal.

6. The remote test system of claim 3 wherein each communication link includes two sections, one for the central station to transmit and the other for it to receive data information and wherein each of said individual switching means is responsive to a command signal for looping a communication link at its associated station by connecting the transmit and receive sections of the communication link together at the station and including an individual test signal generator located at each remote station for connection to the receive section via said individual switching means in response to a command signal for applying to the receive section test signals to measure the line characteristics thereof and test signal generator and analyzer means for receiving and analyzing the test signals over the communications receive section and for also applying test signals to the transmit section.

7. The remote test system of claim 6 wherein each of said individual switching means is responsive to a command signal for placing either of its associated station modems in a digital loop with either one of the two communication links and including digital loop measurement means for applying a digital test signal to the transmit section of the communication link, receiving the transmitted signal over the receive section, and comparing the received signal to the transmitted signal.

8. The remote test system of claim 1 wherein command signals are transmitted over only one communication link and including individual link selector means located at each remote station for detecting that link and connecting thereto its associated station command signal receiver means.

9. The remote test system of claim 3 wherein command signals are transmitted over only one communication link and including individual link selector means located at each remote station for detecting that link and connecting thereto its associated station command signal receiver means.

10. The remote test system of claim 7 wherein command signals are transmitted over only one communication link and including individual link selector means located at each remote station for detecting that link and connecting thereto its associated station command signal receiver means.

11. The remote test and control system of claim 1 wherein the network includes an intermediate processing station containing digital processing means interconnecting either one of the communication links with either one of at least one pair of branch circuits, said processing station including a pair of modems and an individual associated terminal controller for the link pair and for each branch circuit pair with the inputs to all the station terminal controller command demodulation means being connected in common.

12. The remote test and control system of claim 11 wherein the outputs of all the station terminal controller status modulator means are connected in common.

13. A remote test and control system for use with a data communications network interconnecting a central processing station with the data terminal of at least one remote terminal station through a pair of communication links, either of which may be selected for passing data information therebetween, comprising:

command signal transmitter means for generating and transmitting command signals over at least one of the communication links, each command signal being addressed to a selected remote station;

individual command signal receiver means located at each remote station for receiving the command signals addressed to its associated station; and individual switching means located at each remote station responsive to a command signal for connecting the associated station data terminal to the selected one of the communication links.

14. The remote test and control system of claim 13 including individual status signal transmitter means located at each remote station for generating and transmitting over at least one of the communication links a status signal indicative of various station conditions following the receipt of a command signal and status signal receiver means for receiving each status signal and displaying the information contained therein.

15. The remote test and control system of claim 13 wherein each communication link includes two sections, one for the central station to transmit and the other for it to receive data information and wherein each of said individual switching means is responsive to a command signal for looping a communication link at its associated station by connecting the transmit and receive sections of the communication link together at the station and including digital loop measurement means for applying a digital test signal to the transmit section of the communication link, receiving the transmitted signal over the receive section, and comparing the received signal to the transmitted signal.

* * * * *

UNITED STATES PATENT OFFICE

CERTIFICATE OF CORRECTION

Patent No. 3,920,975 Dated November 18, 1975

Inventor(s) Larry F. Bass

It is certified that error appears in the above-identified patent and that said Letters Patent are hereby corrected as shown below:

Column 6, line 49, change "systems" to --system--; and

Column 10, line 22, after "bits" insert --in their proper locations via a gate circuit 80. The--.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*